United States Patent [19]

Monteath et al.

[11] 4,442,881

[45] Apr. 17, 1984

[54] VEHICLE WINDSHIELD PROTECTIVE CURTAIN

[76] Inventors: Don Monteath; Thomas B. Wilson, Jr., both of 3405 N. Dakota, Chandler, Ariz. 85224

[21] Appl. No.: 405,502

[22] Filed: Aug. 5, 1982

[51] Int. Cl.³ .................. E06B 9/08; B60J 3/00
[52] U.S. Cl. ................... 160/25; 160/368 S; 160/DIG. 3; 160/DIG. 10; 296/95 C; 296/97 D
[58] Field of Search .................. 160/DIG. 2, DIG. 3, 160/DIG. 10, DIG. 13, DIG. 16, 25, 368 S; 296/95 R, 95 C, 97 C, 97 D, 97 K, 97 E

[56] References Cited

U.S. PATENT DOCUMENTS

| 606,468 | 6/1898 | Lord. | |
|---|---|---|---|
| 700,362 | 5/1902 | Niehaus | 160/DIG. 1 |
| 1,406,499 | 2/1922 | Sanberg | 160/DIG. 1 |
| 1,441,501 | 1/1923 | Hein. | |
| 1,621,972 | 3/1927 | Darby. | |
| 1,825,538 | 9/1931 | Pace | 160/DIG. 2 |
| 2,119,803 | 6/1938 | Brown | 49/463 |
| 2,595,833 | 5/1952 | Flaherty | 160/DIG. 2 |
| 2,723,714 | 9/1955 | Moore | 160/23 |
| 2,944,601 | 7/1960 | Compson | 296/95 C |
| 3,003,812 | 10/1961 | Haugland | 296/97 |
| 3,410,601 | 11/1968 | Thompson | 160/368 S |
| 4,172,613 | 10/1979 | Furando | 160/DIG. 3 |
| 4,179,155 | 12/1979 | Ortiz | 296/97 C |

FOREIGN PATENT DOCUMENTS 425491  5/1967  Switzerland.

*Primary Examiner*—Peter M. Caun
*Assistant Examiner*—Cherney S. Lieberman
*Attorney, Agent, or Firm*—Warren F. B. Lindsley

[57] ABSTRACT

A removable windshield protective device for application midway of the width of the windshield of a vehicle and having roller curtains capable of being withdrawn over the windshield from the center to each side of the windshield and attached thereto. The device employs spring-biased tabs on one end of the housing of the device for mounting the device adjacent the windshield by extending between the molding of the windshield and its glass and a tab at the other end for extending between the glass of the windshield and the dashboard of the vehicle.

1 Claim, 9 Drawing Figures

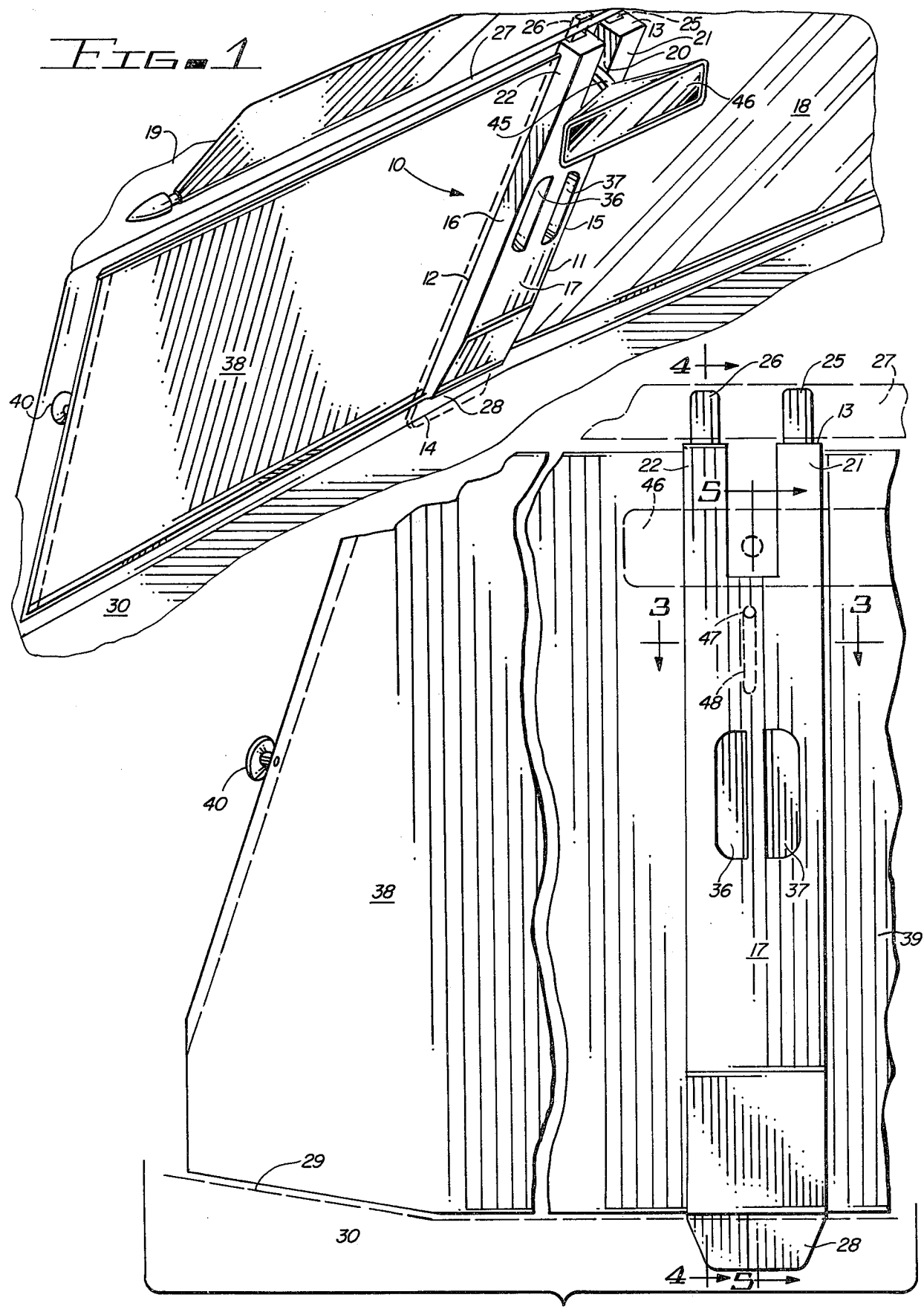

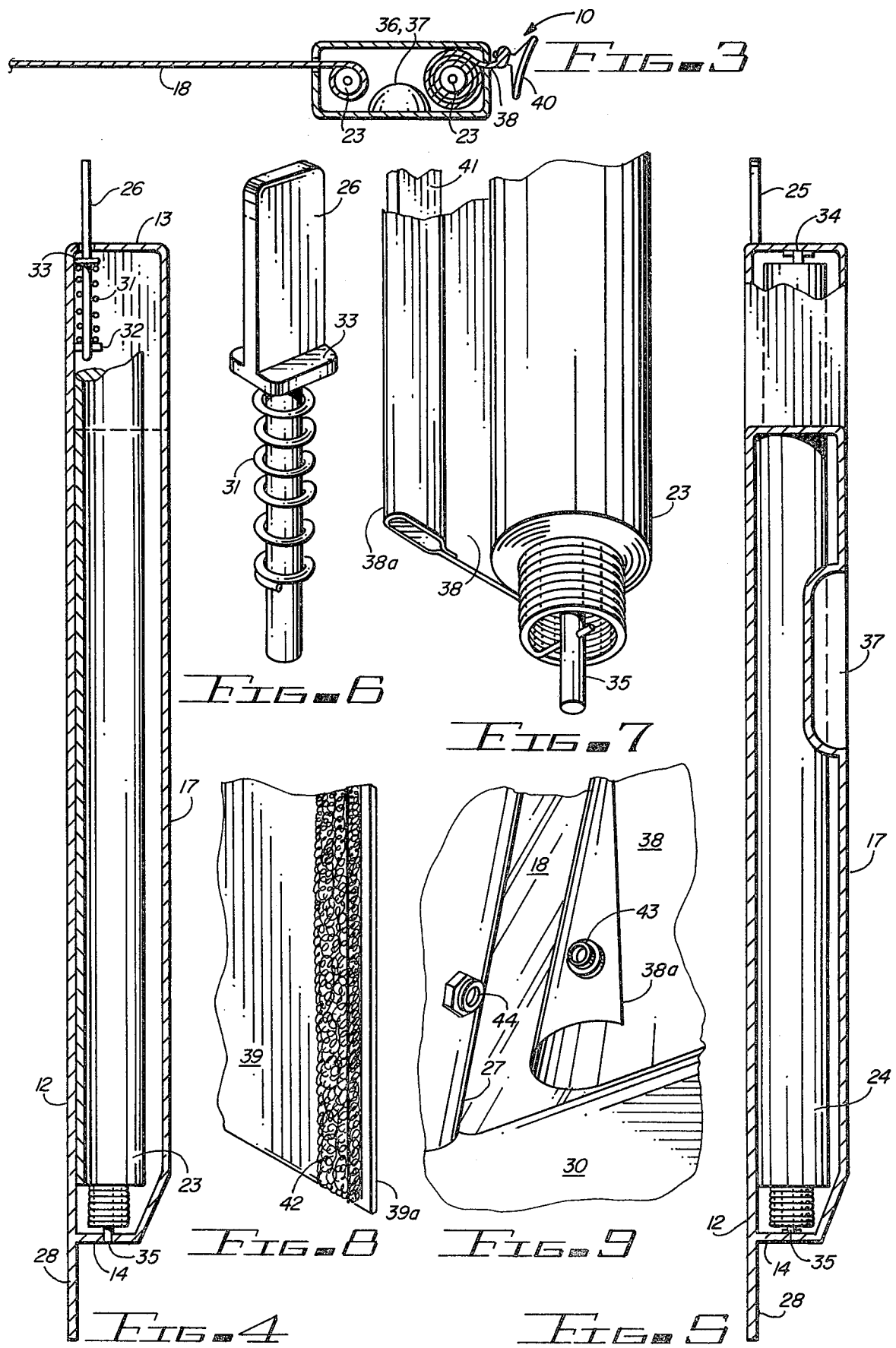

VEHICLE WINDSHIELD PROTECTIVE CURTAIN

BACKGROUND OF THE INVENTION

This invention relates to a curtain for vehicle windshields and, more particularly, to a device which may be adjustably and removably secured on a dashboard of a motor vehicle, boat or the like to shade the interior of the vehicle from the hot rays of the sun.

The protective curtain must be mounted on one or more rollers housed in a mounting bracket which is detachably fastened inside of the vehicle at a point midway of the length of the windshield with the extendable curtains anchoring at a point adjacent the sides of the windshield.

Heretofore, such windshield protective devices have been bulky, expensive to manufacture and usually, when mounted, are intended to remain in place, thereby providing a distraction to the operator of the vehicle.

Thus, a new and improved curtain for inside mounting on the windshield of a vehicle is needed which is intended to be temporarily used each time the vehicle is parked in the sun.

DESCRIPTION OF THE PRIOR ART

U.S. Pat. No. 606,468 is directed to a curtain fixture employing a pair of curtain-rolls lying in parallel and adjacent positions at the midpoint of a window and extending inwardly and downwardly of this point to cover the window.

U.S. Pat. No. 1,406,499 discloses automobile side curtains which may be quickly placed in position on opposite sides of its top.

U.S. Pat. No. 1,441,501 discloses a vehicle windshield attachment employing a translucent member extending transversely of the shield and adapted for holding in any adjusted position vertically thereof, so that a driver of the vehicle may observe the road through the member without the blinding effects of the sun.

U.S. Pat. No. 1,621,972 discloses an antiglare shield for motor vehicles and the like for mounting on the windshield of the vehicle employing a transparent colored strip of pyrolin celluloid on a roller in a predetermined casing.

U.S. Pat. No. 2,723,714 discloses a vehicle windshield protective curtain for mounting on the outside of the vehicle, wherein the curtain is housed in a mounting fastened to the drain gutters on one side of the windshield.

U.S. Pat. No. 3,003,812 discloses an antiglare device for vehicles employing an extendable panel of translucent or opaque material which is pleated and/or folded.

U.S. Pat. No. 3,410,601 discloses a windshield protective device mounted in a particular fixture and having roller curtains capable of being drawn over the windshield from the center to each side edge thereof and held in place by vacuum cups.

U.S. Pat. No. 4,179,155 discloses a light shade mountable in a plurality of positions by means of an articulated reversible mounting bracket.

Swiss Pat. No. 425,491 discloses dual roller-type curtains mounted exteriorly of the windshield and held in the extended position by hooks.

Although these patents are of interest, none of them disclose an easily mountable and demountable curtain containing fixture that can be stored under the seat of the vehicle, for example, and easily mounted on the windshield each time the vehicle is parked in the sun.

SUMMARY OF THE INVENTION

In accordance with the invention claimed, a relatively simple to construct and easy to install vehicle windshield protective curtain is provided which may be mounted on the dashboard of the vehicle when it is desired to shade the interior of the car from the sun.

It is, therefore, one object of this invention to provide a protective device for mounting above the dashboard of a vehicle for protecting the interior of the car from the heat and rays of the sun.

Another object of this invention is to provide a sun protective accessory which can be readily and without substantial effort applied to the windshield of a vehicle when needed by its operator.

A further object of this invention is to provide a new and novel mounting means for a sunshade for application to the windshield of a vehicle which is expandable to fit most vehicles.

Further objects and advantages of the invention will become apparent as the following description proceeds; and the features of novelty which characterize this invention will be pointed out with particularly in the claims exceed to and forming a part of this specification.

BRIEF DESCRIPTION OF THE DRAWINGS

The present invention may be more readily described by reference to the accompanying drawings in which:

FIG. 1 is a perspective drawing of a protective device embodying the invention mounted interiorally of a vehicle on its windshield;

FIG. 2 is an enlarged partial plan view of the device shown in FIG. 1 with the curtains shown in drawn position;

FIG. 3 is a cross-sectional view of FIG. 2 taken along the line 3—3;

FIG. 4 is a cross-sectional view of FIG. 2 taken along the line 4—4;

FIG. 5 is a cross-sectional view of FIG. 2 taken along the line 5—5;

FIG. 6 is an enlarged view of the spring-biased tab at the top end of the device shown in FIG. 4;

FIG. 7 is an enlarged partial view of the bottom end of the roller assembly shown in FIG. 4 and employing magnetic strip attachment means;

FIG. 8 is an enlarged partial view of one end of the shade of the rollers shown in FIGS. 1 and 2 and employing a Velcro strip fastening means; and FIG. 9 is an enlarged partial view of the assembly shown in FIGS. 1 and 2 employing a snap connection for fastening the shade to the side of a windshield when the curtain is in its extended position.

DESCRIPTION OF THE PREFERRED EMBODIMENT

Referring more particularly to the drawings by characters of reference, FIGS. 1, 2 and 4 disclose a vehicle windshield protective device 10 comprising a unitary elongated housing 11, preferably shaped by stamping and bent to form a back 12, ends 13 and 14, side walls 15 and 16 and a front 17. If desired, the housing may be molded or extruded out of a suitable plastic material. This device is shown as being mounted adjacent the inside of a windshield 18 of a vehicle 19 substantially midway of the length of the windshield.

The upper end 13 of device 10 is bifurcated to form a slot 20 between two leg-shaped protrusions 21 and 22, which protrusions are arranged to receive interiorly thereof common ends of shade-mounted rollers 23 and 24 shown in FIGS. 4 and 5, respectively. At the ends of protrusions 21 and 22 are mounted spring-biased tabs 25 and 26, respectively, which are intended for sliding under the molding 27 of the window forming the windshield 18 of the vehicle 19 when installed for use. The other end 14 of device 10 is provided with a tab 28 extending substantially across the width of housing 11 for positioning between the upper edge 29 of a dashboard 30 of vehicle 11 and the lower edge and surface of window 18.

Tabs 25 and 26 are each biased outwardly thereof by a spring 31 mounted between a bracket 32 secured to the back 12 of housing 11 and a collar 33 forming a part of each of the tabs 25 and 26. Collars 33 are biased toward the interior surface 13 of housing 11 to hold each of the tabs in a spring-biased arrangement, as shown.

Rollers 23 and 24 are mounted in housing 11 in the known manner of the common window shades with their upper ends provided with a pin 34 journaled in end 13 of housing 11, as shown in FIG. 5, and their bottom ends having the known spring-biased pin 35 journaled in end 14 of the housing, as shown in FIGS. 4 and 5.

Surface 17 of housing 11 may be provided with two spaced, elongated indentations 36 and 37 which form finger grips for holding the housing when positioning and mounting the protective device 10 adjacent windshield 18 and for removal from the windshield.

The rollers 23 and 24 are provided with curtains 38 and 39 which are similar to conventional shade roller curtains, except that they do not have the ratchet stop mechanism usually embodied in the conventional shade rollers. This ratchet mechanism, however, may be provided if so desired. The material of curtains 38 and 39 may be of any suitable fabric but is preferably a commercially available vinyl covered with rayon material. The leading or free edges 38a and 39a of each curtain have a suitable attachment means secured at a point on the leading edge of the curtain or along substantially its full length.

As shown in FIGS. 1 and 2, the leading edge 38a of curtain 38 is provided with a vacuum cup 40 for engaging a suitable place on the molding 27 of the windshield 18 or a frame of the vehicle for holding the curtain in its extended position.

FIG. 7 illustrates a modification of the vacuum cup curtain holding means shown in FIGS. 1 and 2, wherein a magnetic strip 41 is secured along the leading edge 38a of curtain 38 which may be magnetically secured to a metallic part of the vehicle along the edge of the windshield when curtain 38 is extended.

FIG. 8 shows a further modification of the curtain holding means wherein a Velcro strip 42 is attached along the leading edge of the curtain which is secured to another portion of the Velcro fastener fastened to the interior of the vehicle when the curtain is in its extended position.

FIG. 9 is a still further modification of the curtain connectors shown in FIGS. 1, 2, 7 and 8, wherein the curtain 38 is provided with a snap connection comprising male and female snap portions 43 and 44. These portions snap together under pressure in the usual manner and are separated by pulling the parts apart.

In use, the windshield protective device is placed inside of the vehicle is a generally vertical position adjacent the windshield with the bifurcated protrusions 21 and 22 receiving therebetween the bracket 45 of the mirror 46 of the vehicle, as shown in FIG. 1.

The upper spring-biased tabs 25 and 26 are pressed into the space between molding 27 and the windshield 18 with the springs of the tabs compressed fully, so that the tab 28 at the other end of the housing 11 may be inserted between the glass of the windshield 18 and the dashboard 30 of the vehicle, as shown in FIGS. 1 and 2. The pressure applied by the user through the finger grips 36 and 37 to the tabs 25 and 26 is then released. The housing is now held firmly in place.

The curtains 38 and 39 are then extended and fastened in place covering the windshield, thereby maintaining the interior of the vehicle cool, and particularly the steering wheel, ignition and other dashboard accessories. When the vehicle is to be operated, the curtains are withdrawn into housing 11 in the usual manner.

At this point, the housing is usually removed from the windshield by the user or operator of the vehicle by gripping frame 11 of the device in the finger grips 36 and 37 and then pushing the frame upwardly until tab 28 clears the dashboard, at which time the protective device may be removed from the windshield by pulling downwardly on the front to remove tabs 25 and 26 from underneath the window molding.

If desired, the protective device may be further modified to employ a retrieving lever 47 mounted to extend through a slot 48 in the front 17 of the housing 11 which is attached to each of collars 33 in a suitable manner for retrieving the tabs simultaneously from their extended positions underneath molding 27, so that the top end of the housing may be loosened from molding 27 first when the protective device is removed from the windshield of the vehicle.

Thus, a simple, effective and easily manufactured windshield protective device is provided which meets a need of the driving public particularly in the southern parts of this country and offers on the extended curtain surfaces a place for an advertising display.

Although but a few embodiments of the present invention have been illustrated and described, it will be apparent to those skilled in the art that various changes and modifications may be made therein without departing from the spirit of the invention or from the scope of the appended claims.

What is claimed is:

1. A protective device for vehicle windshields comprising:
   a unitary housing having sides, ends and a front,
   one of said ends being bifurcated to form a pair of spaced protrusions for receiving therebetween when mounted adjacent the windshield the bracket of a rear view mirror of the vehicle,
   each of said protrusions having a spring biased tab extending outwardly thereof,
   a third tab mounted to extend outwardly of the other end of said housing,
   a pair of roller curtains journaled in said housing to extend longitudinally thereof,
   an upper end of each of said roller curtains being mounted, one within each of said protrusions of said housing,
   the leading edge of said curtains extending out of opposite sides of said housing for withdrawal of at least a part of said curtains from said housing, means attached to the leading edge of each of said curtains for detachably securing said curtains in their extended positions to the sides of the vehicle adjacent to the windshield, and spaced finger gripping indentations formed in the front of said housing for use when mounting and removing the device from the windshield of a vehicle, whereby when said protective device is placed adjacent the windshield of a vehicle interiorly thereof and the third tab is inserted between the window and dash board of a vehicle and the tab on each of said protrusions is retracted against its biasing means and then released to extend between the top of the windshield and its molding, the housing is firmly held in place juxtapositioned to the windshield.

* * * * *